(12) United States Patent
Kim (10) Patent No.: US 7,062,290 B2
(45) Date of Patent: Jun. 13, 2006

(54) METHOD FOR GENERATING AND TRANSMITTING OPTIMAL CELL ID CODE

(75) Inventor: Bong Hoe Kim, Gyunggi-Do (KR)

(73) Assignee: LG Electronics Inc., Seoul (KR)

( * ) Notice: Subject to any disclaimer, the term of this patent is extended or adjusted under 35 U.S.C. 154(b) by 290 days.

(21) Appl. No.: 10/634,896

(22) Filed: Aug. 6, 2003

(65) Prior Publication Data

US 2004/0029573 A1    Feb. 12, 2004

(30) Foreign Application Priority Data

Aug. 10, 2002   (KR)   ...................... 10-2002-0047368

(51) Int. Cl.
*H04B 7/20*    (2006.01)

(52) U.S. Cl. ........................ 455/522; 455/450; 455/69; 455/449; 455/560; 370/335

(58) Field of Classification Search ........ 455/436–439, 455/442–443, 450, 509, 512–513, 517, 522, 455/69, 524–525, 560; 370/318, 335, 342, 370/441; 375/149

See application file for complete search history.

(56) References Cited

U.S. PATENT DOCUMENTS

| | | | | |
|---|---|---|---|---|
| 6,650,905 | B1 * | 11/2003 | Toskala et al. ............. | 455/522 |
| 2001/0008523 | A1 * | 7/2001 | Song .......................... | 370/335 |
| 2002/0009129 | A1 * | 1/2002 | Choi et al. .................. | 375/149 |
| 2002/0077141 | A1 * | 6/2002 | Hwang et al. .............. | 455/522 |
| 2002/0115464 | A1 * | 8/2002 | Hwang et al. .............. | 455/522 |
| 2003/0013443 | A1 * | 1/2003 | Willars et al. .............. | 455/432 |
| 2003/0083069 | A1 * | 5/2003 | Vadgama ..................... | 455/436 |
| 2003/0171118 | A1 * | 9/2003 | Miya .......................... | 455/442 |
| 2003/0231606 | A1 * | 12/2003 | Wu et al. .................... | 370/335 |
| 2005/0119003 | A1 * | 6/2005 | Pajukoski et al. .......... | 455/442 |

FOREIGN PATENT DOCUMENTS

| | | |
|---|---|---|
| KR | 10-2001-0053656 | 7/2001 |
| KR | 10-2001-0068680 | 7/2001 |
| KR | 10-2001-0069147 | 7/2001 |
| KR | 10-2001-0077249 | 8/2001 |

* cited by examiner

*Primary Examiner*—Joseph Feild
*Assistant Examiner*—Kamran Afshar
(74) *Attorney, Agent, or Firm*—Fleshner & Kim, LLP

(57) ABSTRACT

A method for generating and transmitting a cell ID code for cell recognition is disclosed. The first 16-bit cell ID codes for 2-bit FBI field are generated from 16-bit Hadamard codes, and the first and ninth bits of the Hadamard codes are punctured, to thereby generate the second 14-bit cell ID code for the 2-bit FBI field. The puncturing is performed by a network or a terminal.

9 Claims, 6 Drawing Sheets

METHOD FOR GENERATING AND TRANSMITTING OPTIMAL CELL ID CODE

BACKGROUND OF THE INVENTION

1. Field of the Invention

The present invention relates to a mobile communication and, more particularly, to a method for generating and transmitting an optimal cell ID code for site selection diversity transmission (SSDT) in a third generation mobile communication.

2. Description of the Background Art

In general, a code division multiple access (CDMA) system is well known to be interference-limited and require power control to solve the near-far problem and slow shadow fading.

In addition, a third generation mobile communication system based on the CDMA, such as a universal mobile telecommunications system (UMTS), employs fast power control so as to increase system capacity by compensating radio channel variations caused due to multi-path fading by the users. In the fast power control, a user equipment (UE) needs to measure a signal-to-interference ratio (SIR), compare it with a target SIR, and transfers a transmit power control (TPC) command comprising one or more bits to a base station (cell). Upon receiving the TPC command, the base station controls transmission power by the unit of a fixed amount according to the TPC command.

Unfortunately, the fast power control brings about a problem in controlling downlink power control when the UE simultaneously communicates with multiple base stations related to a soft handover.

In the soft handover, all the base stations related to the soft handover simultaneously transmit downlink signals to the UE and independently follows the TPC command received from the UE. Therefore, if there is an error in the uplink TPC command, the transmission power of the base stations would drift.

An increase in the difference between the transmission powers of different base stations causes a reduction in soft handover diversity gain and an increase in the interference to other users.

To overcome this problem, various power balancing schemes have been proposed to compensate for the drift of transmission power. Of the schemes, a site selection diversity transmission (SSDT) has been adopted as a power control scheme in the soft handover environment by the $3^{rd}$-generation partnership project (3GPP).

In SSDT, data are transmitted from only one of the cells involved in the soft handover, i.e., the cell with the least instantaneous path loss to the target UE.

The UE selects one of the cells of its active set as 'primary', and other remaining cells are classified as 'non-primary.'

A primary objective of the SSDT is to transmit on the downlink from the primary cell, thus reducing the interference caused by multiple transmission in a soft handover mode. A second objective is to achieve fast site selection without network intervention, thus maintaining the advantage of the soft handover.

In order to select a primary cell, each cell is assigned a temporary identification (ID) and UE periodically informs linked cells of a primary cell ID. The non-primary cells selected by UE switch off the transmission power. The primary cell ID is delivered by UE to the cells included in the active set via uplink FBI field. SSDT activation, SSDT termination, and ID assignment are all carried out by higher layer signaling.

In SSDT, in order to avoid the channel disconnection due to failure of primary cell selection resulting from a bad channel quality, conditions for being a non-primary cell is quite strict.

The UE periodically transfers the primary cell ID code through a portion of an uplink feedback information (FBI) field assigned for SSDT use (FBI S field). A cell recognizes its state as non-primary if all the following conditions are satisfied:

(1) A received ID code is not identical to its own ID code.
(2) A value of a received uplink signal quality is greater than a predetermined value defined by the network.
(3) In case of an uplink compressed mode, a bit loss of the ID code is smaller than $N_{ID}/3$ (as a result of uplink compressed mode), wherein $N_{ID}$ is the number of bits in the ID code (after puncturing if puncturing is performed). Otherwise the cell recognizes its state as primary.

In SSDT, a dedicated physical data channel (DPDCH) is transmitted only by the primary cell, whereas a dedicated physical control channel (DPCCH) is transmitted by the non-primary cells as well as the primary cell because the DPCCH includes control information.

Figure 1:
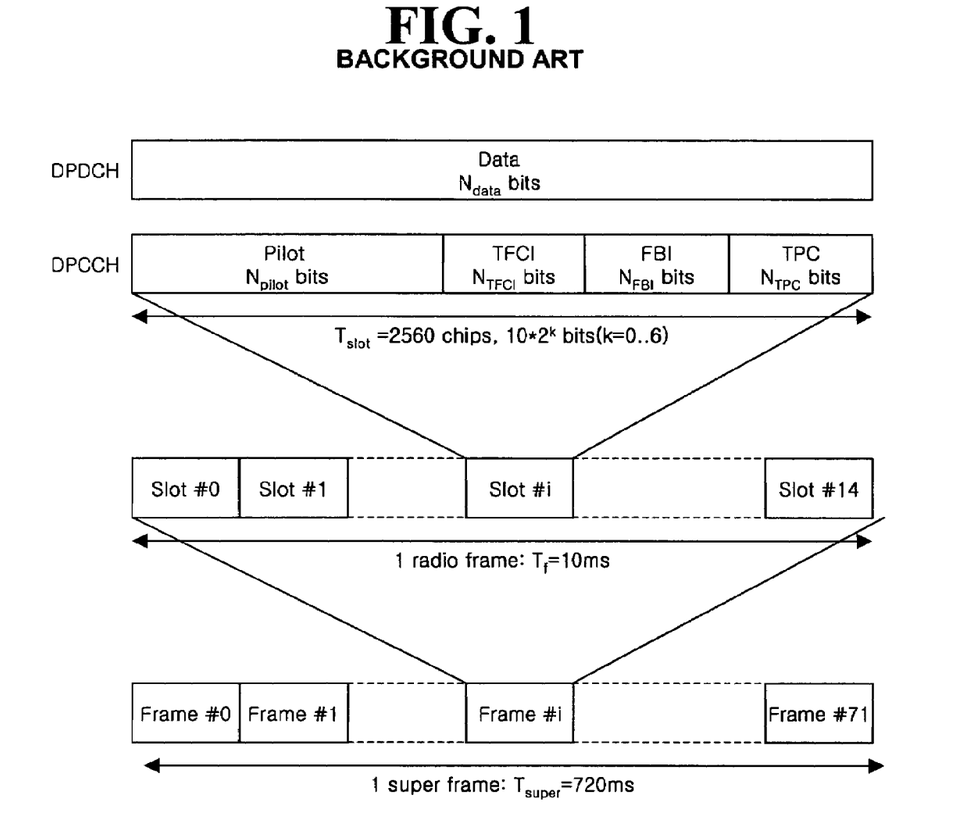
FIG. 1 shows a structure of an uplink DPCH according to 3GPP.

FIG. 1 shows a structure of the uplink DPDCH and the uplink DPCCH. Each radio frame with a length of 10 ms is divided into 15 slots, each of length $T_{slot}=2560$ chips corresponding to one power-control period. The DPDCH and DPCCH are always frame-aligned with each other. As shown in FIG. 1, the DPCCH includes pilot bits to support channel estimation for intervention detection, transmit power control (TPC) commands, feedback information (FBI), and an optional transport format combination indicator (TFCI).

The FBI bits are used to support techniques requiring feedback from the UE to the UTRAN access point such as a closed loop mode transmit diversity and SSDT. The structure of the FBI field is shown in FIG. 2.

Figure 2:
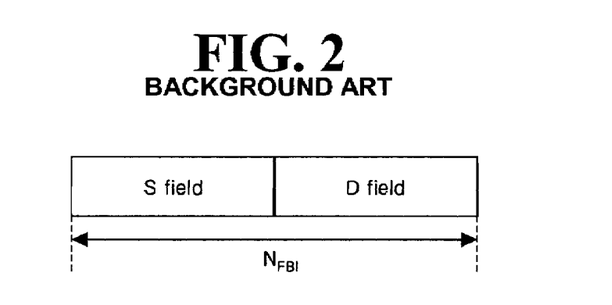
FIG. 2 shows a FBI field of the uplink DPCH in FIG. 1.

As shown in FIG. 2, the FBI field includes an S field for SSDT signaling and a D field for closed loop mode transmit diversity signaling. The S field consists of 0, 1, or 2 bits and the D field consists of 0 or 1 bit. The maximum size of FBI field $N_{FBI}$ is 2 bits. If the FBI field is not entirely filled with S field or D field, the FBI field would be filled with "1". When the $N_{FBI}$ is 2 bits, S field is 0 bit, and D field is 1 bit, left side field is filled with "1" and right side field is D field.

Each cell is given a temporary ID during SSDT and the ID is used as site selection signal, The ID is given as a binary bit sequence. There are three different lengths of coded ID available denoted as "long ", "medium ", and "short. The network decides which length of coded ID is to be used. Setting of ID codes for 1-bit and 2-bit FBI is shown in below table 1 and table 2, respectively.

TABLE 1

Settings of ID codes for 1 bit FBI

| | ID code | | |
|---|---|---|---|
| ID label | "long" | "medium" | "short" |
| A | 000000000000000 | (0)0000000 | 00000 |
| B | 101010101010101 | (0)1010101 | 01001 |
| C | 011001100110011 | (0)0110011 | 11011 |
| D | 110011001100110 | (0)1100110 | 10010 |

TABLE 1-continued

Settings of ID codes for 1 bit FBI

| | ID code | | |
|---|---|---|---|
| ID label | "long" | "medium" | "short" |
| E | 000111100001111 | (0)0001111 | 00111 |
| F | 101101001011010 | (0)1011010 | 01110 |
| G | 011110000111100 | (0)0111100 | 11100 |
| H | 110100101101001 | (0)1101001 | 10101 |

TABLE 2

Settings of ID codes for 2 bit FBI

ID code
(Column and Row denote slot position
and FBI-bit position.)

| ID label | "long" | "medium" | "short" |
|---|---|---|---|
| A | (0)0000000 | (0)000 | 000 |
|   | (0)0000000 | (0)000 | 000 |
| B | (0)0000000 | (0)000 | 000 |
|   | (1)1111111 | (1)111 | 111 |
| C | (0)1010101 | (0)101 | 101 |
|   | (0)1010101 | (0)101 | 101 |
| D | (0)1010101 | (0)101 | 101 |
|   | (1)0101010 | (0)011 | 010 |
| E | (0)0110011 | (0)011 | 011 |
|   | (0)0110011 | (0)011 | 011 |
| F | (0)0110011 | (0)011 | 011 |
|   | (1)1001100 | (0)100 | 100 |
| G | (0)1100110 | (0)110 | 110 |
|   | (0)1100110 | (0)110 | 110 |
| H | (0)1100110 | (0)110 | 110 |
|   | (1)0011001 | (1)001 | 001 |

The ID code bits shown in table 1 and table 2 are transmitted from left to right. In table 2, the first row refers to the first FBI bit in each slot, and the second row refers to the second FBI bit in each slot.

The ID codes are transmitted after being aligned to the radio frame structure (that is, the ID codes shall be terminated within a radio frame). If the FBI is short of a space for transmitting the last ID code within a frame, the first bit(s) of the ID code are punctured. The bit(s) to be punctured are shown in brackets in table 1 and table 2.

As shown in table 1, the minimum Hamming distance of the ID codes for 1 bit FBI is 8 for long code of 15 bits ($d_{min}$=8), 4 for medium code of 8 bits ($d_{min}$=4), 4 for punctured medium code of 7 bits ($d_{min}$=4), and 2 for short code of 5 bits ($d_{min}$=2).

Meanwhile, referring to table 2, the minimum Hamming distance of the ID codes for 2 bit FBI is 8 for long code of 16 bits ($d_{min}$=8), 7 for punctured long code of 14 bits ($d_{min}$=7), 4 for medium code of 8 bits ($d_{min}$=4), 3 for punctured medium code of 6 bits ($d_{min}$=3), and 3 for short code of 6 bits ($d_{min}$=3).

In view of Hamming distance, it is noted that the minimum Hamming distance of the ID code for 1 bit FBI is not changed even after the bit puncturing is performed, However, in case of the ID codes for 2 bit FBI, notably, the minimum Hamming distance is reduced in the long code and minimum code because of the bit puncturing.

Figure 3:
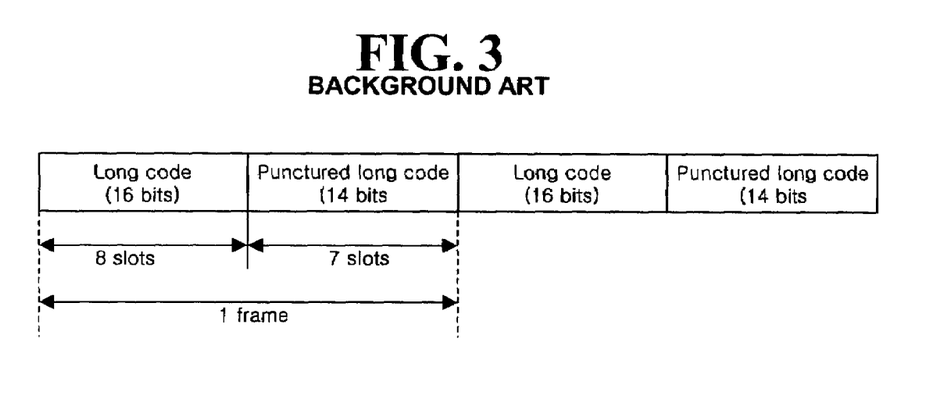
FIG. 3 is a conceptual view for illustrating how cell ID codes are mapped to a radio frame.

FIG. 3 shows how the long ID code for 2-bit-FBI is allocated in the radio frame. One radio frame consists of 15 slots and each slot is given 2 bits for FBI, so that the total number of FBI bits per frame is 30. Accordingly, a long ID code of 16 bits is carried by the first 8 slots of the frame and a long ID code of 14 bits obtained by puncturing first two bits of the 16 bit-long ID code, is carried by the remaining 7 slots of the frame, thereby completing transmission of the ID codes in one radio frame.

However, such cell ID code generation and transmission method the following problem. That is, in the case using the long code for the 2 bit FBI, the minimum Hamming distance of the ID codes is reduced due to the bit puncturing, resulting in degradation of an error correction efficiency of the cell ID code.

The above references are incorporated by reference herein where appropriate for appropriate teachings of additional or alternative details, features and/or technical background.

SUMMARY OF THE INVENTION

Therefore, the present invention has been made in an effort to solve the above problems.

An object of the present invention is to provide a method for generating and transmitting a cell identification codes for SSDT, capable of maintaining a maximum Hamming distance and robust to a fading channel environment.

Another object of the present invention is to provide a method for generating and transmitting a cell identification codes for SSDT, capable of enhancing a system performance by maximizing a decoding gain in cell identification codes.

To achieve at least the above objects in whole or in parts, there is provided a cell ID code generating method in a radio communication system including: receiving candidate codes of cell ID codes from a network; selecting one candidate code on the basis of power of a common pilot channel (CPICH) of each cell; and puncturing the selected candidate code to generate a primary cell ID code.

Preferably, the candidate code is a temporary cell ID code which is 8 Hadamard codes with a 16-bit length.

Preferably, the puncturing is performed in such a manner that the Hamming distance is not reduced.

Preferably, two '0' bits are punctured in the candidate code.

Preferably, the two zero bits are the first and the ninth bits of the temporary cell ID code of the 16-bit length.

To achieve at least these advantages in whole or in parts, there is further provided a cell ID code generating method in a wireless system in which a primary cell is recognized by receiving a primary cell ID code from a terminal (UE), including: receiving a temporary cell ID code from a network; and puncturing a specific bit of the temporary cell ID code in a manner that a minimum Hamming distance is not reduced, to generate a primary cell ID code.

Preferably, the temporary cell ID code is 8 Hadamard codes of 16-bit length.

Preferably, the specific bit is the first and ninth bits of the Hadamard code with the 16-bit length.

To achieve at least these advantages in whole or in parts, there is further provided a cell ID code generating method in a wireless system in which a temporary cell ID code is received from a network, and an identification code of a primary cell is generated and transmitted to a cell, including: generating a Hadamard code; and puncturing specific bits of the Hadamard code in such a manner that a minimum Hamming distance is not reduced, to generate a temporary cell ID code.

Preferably, the temporary cell ID code is 8 Hadamard codes of 16-bit length.

Preferably, the specific bit is the first and ninth bits of the Hadamard code with the 16-bit length.

To achieve at least these advantages in whole or in parts, there is further provided a cell ID code generating method in a wireless system in which a primary cell is recognized by receiving a primary cell ID code from a terminal (UE), including: receiving a temporary cell ID code from a network; measuring power of each common pilot channel (CPICH); selecting one temporary cell ID code assigned to a cell with the strongest CPICH power among temporary cell ID codes; puncturing the selected temporary cell ID code to generate a primary cell ID code; and transferring the primary cell ID code to a cell through an uplink FBI field.

Preferably, the temporary cell ID code is 8 Hadamard codes of 16-bit length.

Preferably, the puncturing is performed in such a manner that a Hamming distance is not reduced.

Preferably, two zero bits are punctured in the temporary cell ID code.

Preferably, the two zero bits are the first and ninth bits of the temporary cell ID code.

To achieve at least these advantages in whole or in parts, there is further provided a cell ID code generating method in a wireless system in which a temporary cell ID code is received from a network, and a primary cell ID code for a cell identification is transmitted, including: puncturing temporary cell ID codes; transferring the punctured temporary cell ID codes; measuring power of common pilot channels (CPICH) of each cell; selecting a temporary cell ID code assigned to a cell with the strongest CPICH power among the received temporary cell ID codes as a primary cell ID code; and transmitting the selected primary cell ID code to a cell through an uplink FBI field.

Preferably, the temporary cell ID code is 8 Hadamard codes of 16-bit length.

Preferably, the puncturing is performed in such a manner that a Hamming distance is not reduced.

Preferably, two zero bits are punctured in the temporary cell ID code.

Preferably, the two zero bits are the first and ninth bits of the temporary cell ID code.

To achieve at least these advantages in whole or in parts, there is further provided a cell ID code generating method in a wireless system in which a terminal receives temporary cell ID codes of each cell from a network and transfers a primary cell ID code to an active cell, wherein the temporary cell ID code and the primary cell ID code are transmitted and received by index.

Preferably, the terminal and cells include a temporary cell ID code table.

Preferably, the temporary cell ID code is a punctured Hadamard code.

Preferably, the punctured Hadamard code is a 16-bit Hadamard code with first and ninth bits punctured.

Preferably, the network transfers an index corresponding to a temporary cell ID code of each cell to each cell and the terminal.

Preferably, the terminal transfers an index of a temporary cell ID code corresponding to a primary cell ID code to every terminal.

To achieve at least these advantages in whole or in parts, there is further provided a cell ID code generating method in a wireless system in which a primary cell ID code is received from a terminal and a primary cell is identified, including a step in which a temporary cell ID code is assigned to each cell by a network; a step in which each cell transfers its allocated temporary cell ID code to a terminal; a step in which each cell receives a primary cell ID code from the terminal; and a step in which each cell compares the primary cell ID code with its temporary cell ID code to identify a primary cell.

Preferably, the temporary cell ID code and the primary cell ID code are transmitted and received by index.

Preferably, the terminal and the cells include a temporary cell ID code table.

Preferably, the temporary cell ID code is a punctured Hadamard code.

Preferably, the punctured Hadamard code is a 16-bit Hadamard code with first and ninth bits punctured.

To achieve at least these advantages in whole or in parts, there is further provided a cell ID code generating method in a wireless system in which a terminal receives temporary cell ID codes of each cell from a network and transfers a primary cell ID code to an active cell, including: receiving temporary cell ID codes of each cell; measuring power of a common pilot channel (CPICH) of each cell; and selecting a temporary cell ID code with the strongest CPICH power as a primary cell ID code and transferring it to every cell.

Preferably, the terminal and each cell include a temporary cell ID code table.

Preferably, the temporary cell ID code and the primary cell ID code are transmitted and received by index.

Preferably, the terminal transfers the primary cell ID code to every cell.

Preferably, the temporary cell ID code is a punctured Hadamard code.

Preferably, the punctured Hadamard code is a 16-bit Hadamard code with first and ninth bits punctured.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Preferred embodiments of the present invention will now be described in detail with reference to the accompanying drawings.

The cell ID code generation method according to the present invention handles only the long ID codes for 2-bit FBI. Meanwhile, the long, medium and short ID codes for 1-bit FBI and the medium and short ID codes for 2-bit FBI explained in the background art can be used together with the long ID codes generated for 2-bit FBI according to the present invention. The well known ID code generation schemes other than the long ID code generation scheme for the 2-bit FBI in association with the present invention will be omitted for description.

In general, the temporary cell ID code used for the SSDT is generated by using a Hadamard code. The temporary cell ID code is generated by a network (that is, an RNC (Radio Network Controller)) and transmitted to a cell (base station) and a terminal.

In the present invention, the temporary cell ID code is used as a primary cell ID code candidate. The terminal determines, one of primary cell ID code candidates (temporary cell ID codes) as a primary cell ID code. In this case, the temporary cell ID code can be transmitted in a form of 8 Hadamard codes or 8 punctured Hadamard codes.

Figure 4:
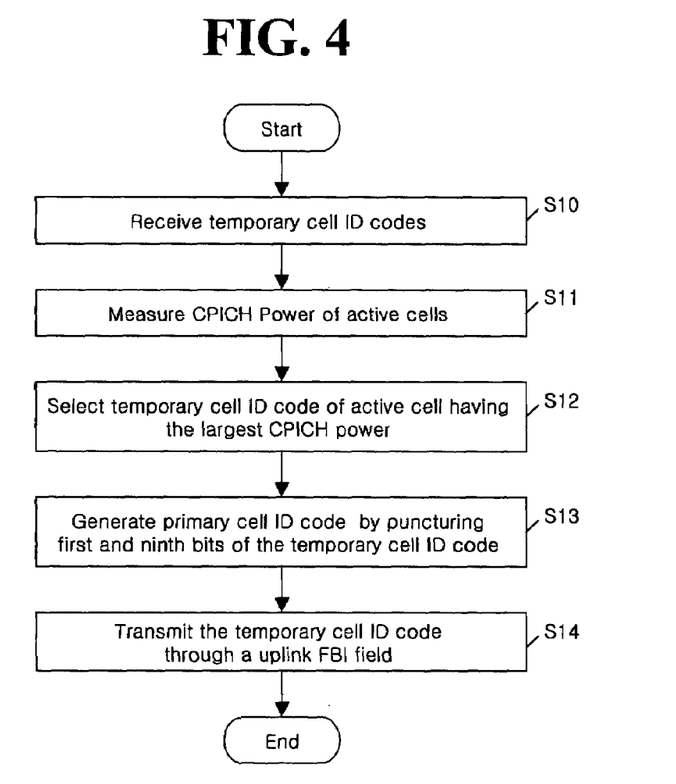
FIG. 4 is a flow chart of a cell ID code transmitting method in accordance with a first embodiment of the present invention.

FIG. 4 is a flow chart of a cell ID code transmitting method in accordance with a first embodiment of the present invention. FIG. 4 shows a case that the network transmits a non-punctured temporary cell ID code (that is, 8 Hadamard codes).

The RNC generates 16 Hadamard codes as shown below, and selects the first 8 codes as the temporary cell ID codes and transmits them.

<Hadamard Codes of Length 16>
$H_{4,0}$=0000 0000 0000 0000
$H_{4,1}$=0101 0101 0101 0101
$H_{4,2}$=0011 0011 0011 0011
$H_{4,3}$=0110 0110 0110 0110
$H_{4,4}$=0000 1111 0000 1111
$H_{4,5}$=0101 1010 0101 1010
$H_{4,6}$=0011 1100 0011 1100
$H_{4,7}$=0110 1001 0110 1001
$H_{4,8}$=0000 0000 1111 1111
$H_{4,9}$=0101 0101 1010 1010
$H_{4,10}$=0011 0011 1100 1100
$H_{4,11}$=0110 0110 1001 1001
$H_{4,12}$=0000 1111 1111 0000
$H_{4,13}$=0101 1010 1010 0101
$H_{4,14}$=0011 1100 1100 0011
$H_{4,15}$=0110 1001 1001 0110

With reference to FIG. 4, when the temporary cell ID codes are inputted from the RNC, the terminal measures code power of common pilot channel (CPICH) that active cells transmit for SSDT, and selects a temporary cell ID code with the strongest power (steps S10–S12).

The terminal punctures the selected temporary cell ID code to generate a primary cell ID code, and transmits the primary cell ID code to active cells through an FBI field of an uplink control channel (steps S13 and S14).

Each active cell compares the primary cell ID code received from the terminal and the temporary cell ID code assigned from the RNC, and then, if the two cell ID codes are identical, each active cell recognizes itself as a primary cell and starts transmitting DPDCH. In this case, the comparing operation can be performed after decoding the primary cell ID code.

If, however, the two cell ID codes are not identical, each cell judges that itself is a non-primary and transmits only DPCCH to the terminal.

A primary cell ID code puncturing operation for an SSDT cell ID code transmission will now be described in detail.

Generally, the first and second bits of the selected long or medium temporary cell ID code are punctured to generate a primary cell ID code.

The long ID code for the 2-bit FBI according to the present invention is generated by the network by using a Hadamard code of 16 bit length as shown below.

The network extracts the first 8 codes as temporary cell ID codes from the 16 Hadamard codes (16-bit length) and transmits them. Table 3 shows the 8 Hadamard codes, that is, the temporary cell ID codes.

These 8 Hadamard codes themselves are used as the long ID codes of 16 bit length for 2-bit FBI and assigned to the first 8 slots of the radio frame.

The long ID codes of 14-bit length assigned to the second 7 slots of the radio frame are generated by puncturing two bits of each long ID code of the 16-bit length. In this case, the bit puncturing should be performed such a manner that no Hamming distance loss occurs. Preferably, the bit puncturing is performed on a bit with a zero bit value. For example, in the ID code generating method of the present invention, the first and ninth bits with a bit value '0' are punctured in the long ID codes of 16-bit length, to thereby generate the 14-bit long ID codes.

TABLE 3

| ID label | ID code | | | |
|---|---|---|---|---|
| A | (0)000 | 0000 | (0)000 | 0000 |
| B | (0)101 | 0101 | (0)101 | 0101 |
| C | (0)011 | 0011 | (0)011 | 0011 |
| D | (0)110 | 0110 | (0)110 | 0110 |
| E | (0)000 | 1111 | (0)000 | 1111 |
| F | (0)101 | 1010 | (0)101 | 1010 |
| G | (0)011 | 1100 | (0)011 | 1100 |
| H | (0)110 | 1001 | (0)110 | 1001 |

Table 3 shows the long ID codes of 14-bit length with the first bit and the ninth bits punctured. Thus, in case that a receiving side decodes the long ID codes for the 2 bit FBI, the transmitting side is able to know the punctured bits (the first and ninth bits) in advance, so that 2 bit decoding gain can be obtained.

In other words, because the first and ninth bits of the Hadamard codes (the long ID codes of 16-bit length) are all zero bits, even though the two bits are punctured from the long ID codes of 16-bit length, the minimum Hamming distance is not reduced. The two bits subjected be punctured are put in parentheses.

The thusly generated long ID codes can be expressed for the 2-bit FBI as shown in below Table 4.

TABLE 4

| ID label | ID code | | | | | | | |
|---|---|---|---|---|---|---|---|---|
| A | (0) 0 | 0 | 0 | 0 | (0) 0 | 0 | 0 | 0 |
| B | (0) 1 | 0 1 | 0 1 | 0 1 | (0) 0 1 | 0 1 | 0 1 | 0 1 |

TABLE 4-continued

| ID label | ID code | | | | | | | |
|---|---|---|---|---|---|---|---|---|
| C | (0) | 1 | 0 | 1 | (0) | 1 | 0 | 1 |
|   | 0 | 1 | 0 | 1 | 0 | 1 | 0 | 1 |
| D | (0) | 1 | 0 | 1 | (0) | 1 | 0 | 1 |
|   | 1 | 0 | 1 | 0 | 1 | 0 | 1 | 0 |
| E | (0) | 0 | 1 | 1 | (0) | 0 | 1 | 1 |
|   | 0 | 0 | 1 | 1 | 0 | 0 | 1 | 1 |
| F | (0) | 0 | 1 | 1 | (0) | 0 | 1 | 1 |
|   | 1 | 1 | 0 | 0 | 1 | 1 | 0 | 0 |
| G | (0) | 1 | 1 | 0 | (0) | 1 | 1 | 0 |
|   | 0 | 1 | 1 | 0 | 0 | 1 | 1 | 0 |
| H | (0) | 1 | 1 | 0 | (0) | 1 | 1 | 0 |
|   | 1 | 0 | 0 | 1 | 1 | 0 | 0 | 1 |

In Table 4, the first row is assigned as the first FBI bits in each slot of the radio frame, and the second row is assigned as the second FBI bits in each slot of the frame.

Therefore, the terminal transfers 16-bit primary cell ID codes through the 2-bit FBI field of the first 8 slots of one radio frame and 14-bit punctured primary cell ID codes through the 2 bit FBI field of the last 7 slots of the radio frame.

Figure 5:
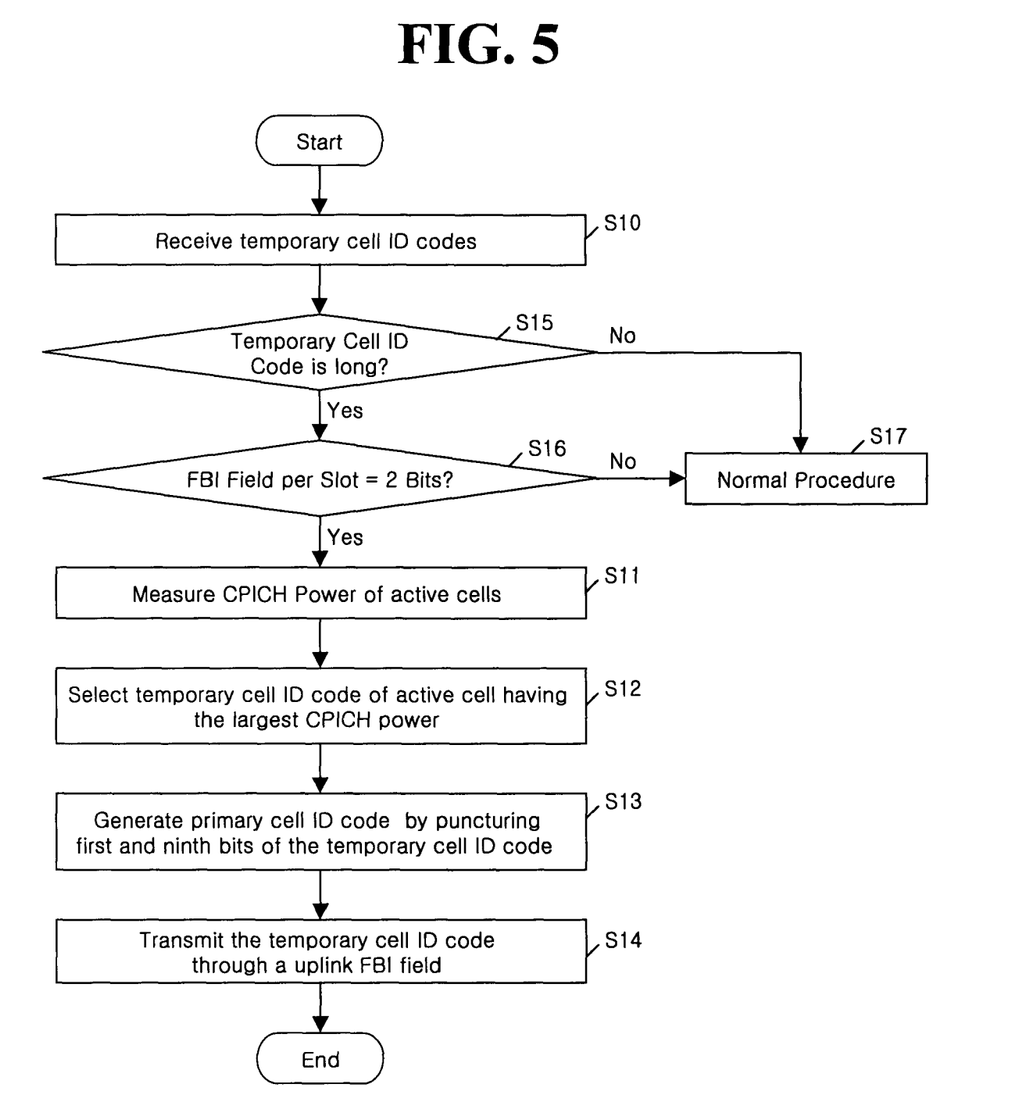
FIG. 5 is a detailed flow chart of the cell ID code transmitting method of FIG. 4.

FIG. 5 is a detailed flow chart of the cell ID code transmitting method of FIG. 4, which is the same as FIG. 4 except for the steps S15–S17.

As shown in FIG. 5, the terminal judges whether the received temporary cell ID codes are long (step S15). As mentioned above, because use of the long ID codes is determined by the network, the terminal can easily recognize whether the long ID codes have been used.

If the primary cell ID codes are not long, the terminal generates a primary cell ID according to a related ID code processing procedure and transmits it (step S17). If, however, the temporary cell ID codes are long, the terminal judges whether two bits have been assigned as the FBI bits for the SSDT is 2 (step S16).

If the number of allocated FBI bits is not 2, the terminal performs the step S17. If, however, the number of allocated FBI bits is 2, the terminal performs the steps S11–S14. The steps S15–S17 can be performed after the step S10 or the step S13 as necessary.

Figure 6:
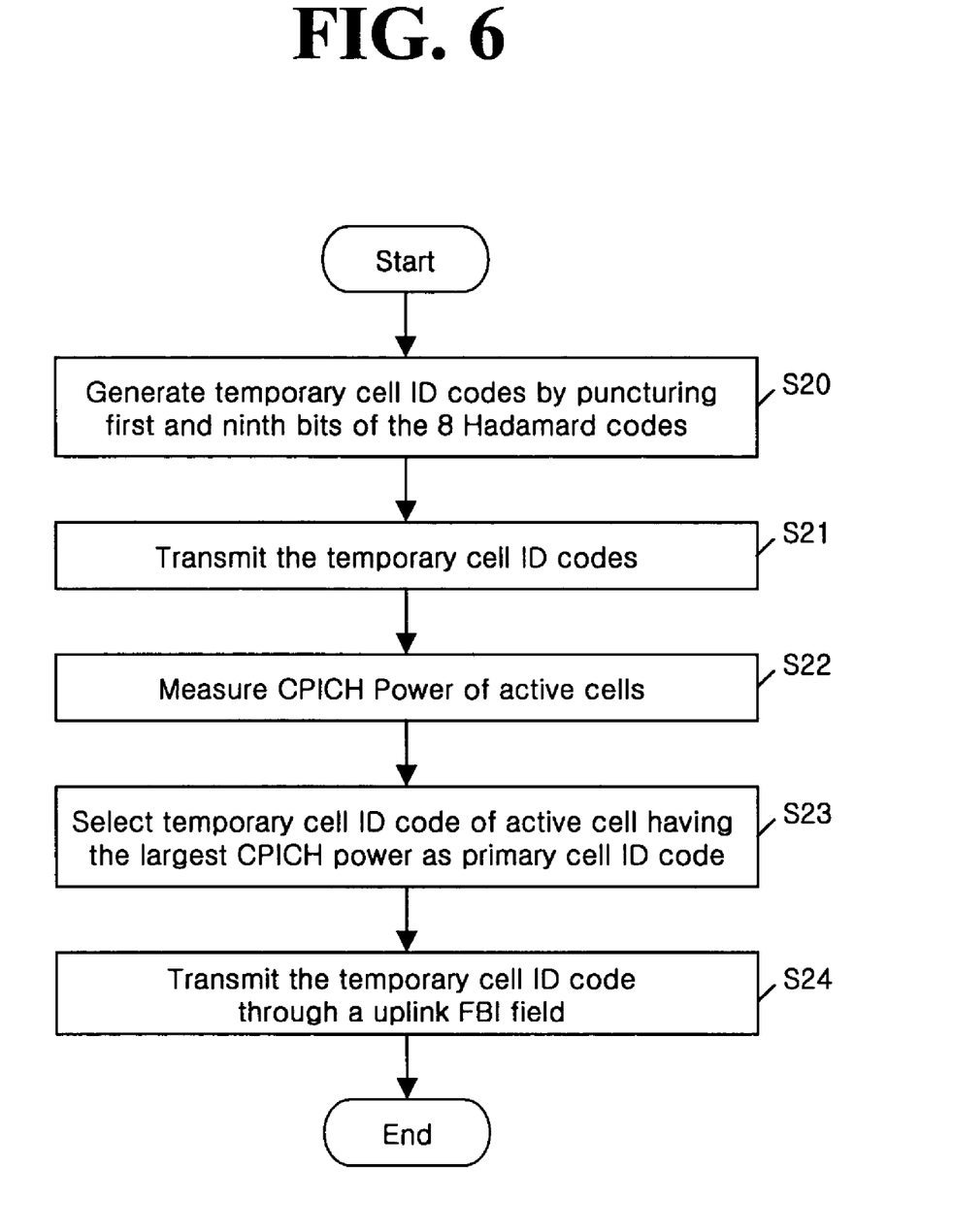
FIG. 6 is a flow chart of a cell ID code transmitting method in accordance with a second embodiment of the present invention.

FIG. 6 is a flow chart of a cell ID code transmitting method in accordance with a second embodiment of the present invention. FIG. 6 is applied to a case that the network transfers punctured temporary cell ID codes.

The network extracts the first 8 codes as temporary cell ID codes from the 16 Hadamard codes (16 bits). The extracted 8 Hadamard codes, that is, the temporary cell ID codes, are punctured as shown in Table 3 and Table 4 and then transmitted to the terminal (steps S20 and S21).

When the temporary cell ID codes are inputted from the network, the terminal measures code power of CPICHs that active cells transfer, and selects a temporary cell ID code of an active cell (primary cell) with the strongest code power as a primary cell ID code (steps S22 and S23).

The terminal transfers the selected primary cell ID code to the active cells through the FBI field of the uplink control channel (step S24). That is, the terminal transfers the 16-bit primary cell ID codes through the 2-bit FBI field of the first 8 slots of one radio frame and the punctured 14-bit primary cell ID codes through the 2-bit FBI field of the last 7 slots of the radio frame.

Each active cell compares the primary cell ID code received form the terminal and the temporary cell ID code assigned by the RNC, and if the two cell ID codes are identical, each cell recognizes itself as a primary cell and starts transmitting DPDCH to the terminal. If, however, the two cell ID codes are not identical, each cell judges itself as non-primary and transmits only DPCCH to the terminal.

Figure 7:
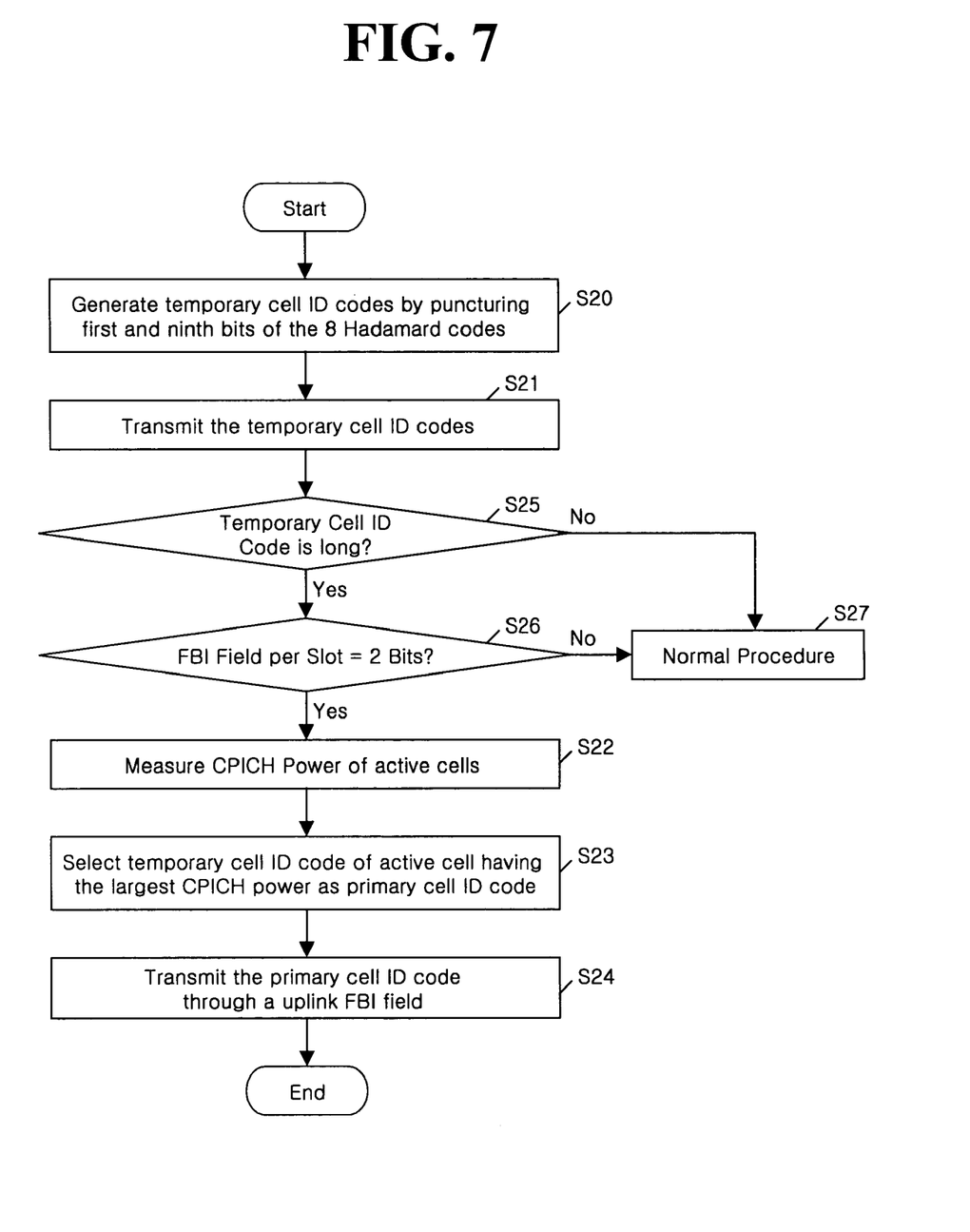
FIG. 7 is a detailed flow chart of the cell ID code transmitting method of FIG. 6.

FIG. 7 is a detailed flow chart of the cell ID code transmitting method of FIG. 6. Except for the steps 25–27, the process of FIG. 7 is the same as that of FIG. 6.

As shown in FIG. 7, the terminal judges whether the received temporary cell ID code is long (step S25). If the primary cell ID code is not long, the terminal generates a primary cell ID according to a related ID code processing procedure and transmits it (step S27). If, however, the temporary cell ID code is long, the terminal judges whether the number of FBI bits assigned for the SSDT is 2 (step S26).

If the number of assigned FBI bits is not 2, the terminal performs the step S27. If, however, the number of assigned FBI bits is 2, the terminal performs the steps S21–S24. The steps S25–S27 can be performed after the step S23 as necessary.

Figure 8:
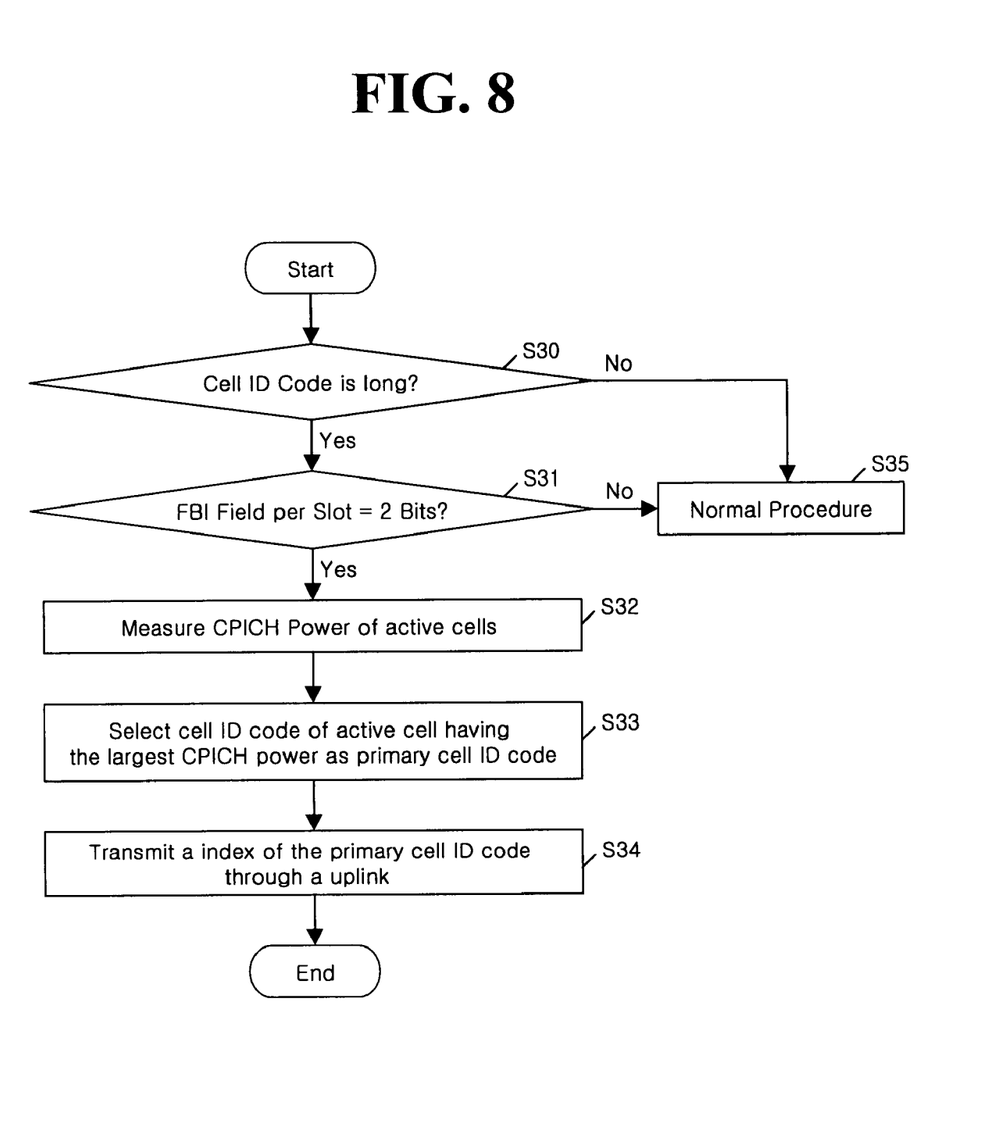
FIG. 8 is a flow chart of a cell ID code transmitting method in accordance with a third embodiment of the present invention.

FIG. 8 is a flow chart of a cell ID code transmitting method in accordance with a third embodiment of the present invention.

In the current 3GPP standards, the terminal and cells have a temporary cell ID code table such as Table 4. The temporary cell ID code is 8 punctured Hadamard codes, and the puncturing operation is performed in the same manner as in the first and second embodiments.

The terminal and each cell having the cell ID code table, a Node B first designates a cell ID code of each cell, THAT IS, a temporary cell ID code, and transfers the designated temporary cell ID code to each corresponding cell and the terminal.

At this time, the Node B transfers not the cell ID code but merely an index to each cell. That is, the Node B transfers only the index, not the temporary cell ID code of each cell. Accordingly, each cell recognizes a cell ID code corresponding to the received index as its temporary cell ID code, and the terminal can recognize the temporary cell ID code of each cell on the basis of the received index.

Recognizing the temporary cell ID code of each cell, the terminal measures CPICH power of each cell and transfers a temporary ID code of a cell with the strongest CPICH power as a primary cell ID code to every cell. At this time, the terminal may transfer the temporary ID code or an index to each cell.

Then, each active cell compares the received primary cell ID code and its temporary cell ID code. If the two cell ID codes are identical, the active cells transfer DPDCH to the terminal. If, however, the two cell ID codes are not identical, each active cell transfers only a DPCCH.

Meanwhile, when the index is received from the terminal, each cell recognizes a corresponding primary cell ID code from the cell ID code table, and performs the above operation.

That is, the operation of FIG. 8 is applied to the case that the terminal and the cell have the cell ID code table. As shown in FIG. 8, the terminal discriminates whether an ID code used in a current system is a long ode (step S30). If the ID code is not long, the terminal performs a normal procedure according to a related ID code processing procedure (step S35). If, however, the cell ID code is long, the terminal discriminates whether the corresponding long ID code is a code for 2-bit FBI (step S31).

If the FBI bit for the long ID code is not 2 bits, the terminal performs the step S35. If, however, two bits have been allocated for the FBI bit, the terminal measures code power of CPICH that active cells transfers, and selects a temporary cell ID code of an active cell with the strongest power as a primary cell ID code (steps S32 and S33).

Thereafter, the terminal transfers the selected primary cell ID code or an index corresponding to the primary cell ID code to the active cells through an uplink control channel (step S24), and then, each active cell compares a temporary cell ID of the cell ID code table corresponding to the primary cell ID code or the index with its temporary cell ID code.

Upon comparison, if the two cell ID codes are identical, each cell recognizes itself as a primary cell and transfers a DPDCH to the terminal. If, however, the two cell ID codes are not identical, each cell judges itself a non-primary and transfers only DPCCH to the terminal.

As so far described, the cell ID code generating and transmitting method of the present invention has the following advantages.

That is, for example, the 14-bit long ID codes, which corresponds to the 16-bit long ID codes, are generated by puncturing the first and ninth zero bits of the 16-bit long ID codes, so that the minimum Hamming distance is not reduced in spite of the puncturing of two bits, and thus, two bit decoding gain can be obtained.

In addition, because the generated cell ID codes maximize the minimum Hamming distance, an error rate can be minimized in an additive white Gaussian noise environment as well as in a fading channel environment.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of transmitting a cell ID code in a mobile communication system, in which a primary cell is recognized by receiving a primary cell ID code from a terminal, comprising:
   receiving a plurality of temporary cell ID codes from a control center;
   measuring a power of a Common Pilot Channel (CPICH) of a cell;
   selecting a temporary cell ID code with a strongest power of the CPICH of the cell;
   checking whether the selected temporary cell ID code has a length of 16-bits;
   checking whether feedback information (FBI) bits are 2 bits, if the detected temporary cell ID code has the length of 16-bits;
   puncturing two '0' bits in the selected temporary cell ID code to generate a primary cell ID code having one of the following bit configurations with the punctured bits indicated in parentheses:
   A: (0)000 (0)000
       0 000 0 000
   B: (0)000 (0)000
       1 111 1 111
   C: (0)101 (0)101
       0 101 0 101
   D: (0)101 (0)101
       1 010 1 010
   E: (0)011 (0)011
       0 011 0 011
   F: (0)011 (0)011
       1 100 1 100
   G: (0)110 (0)110
       0 110 0 110
   H: (0)110 (0)110
       1 001 1 001; and
   transmitting the selected 16-bit temporary cell ID code through a 2-bit FBI field of the first 8 slots of one radio frame and transmitting the 14-bit punctured primary cell ID codes through a 2-bit FBI field of the last 7 slots of the radio frame.

2. The method of claim 1, wherein the control center is a radio network controller (RNC) and the plurality of primary cell ID codes are transmitted to active cells via a portion of an uplink FBI field.

3. The method of claim 2, wherein the active cells compare the primary cell ID code with the temporary cell ID code assigned from the RNC; and wherein each active cell identifies itself as a primary cell and transmits a Dedicated Physical Data Channel (DPDCH) and a Dedicated Physical Control Channel (DPCCH) to the terminal if the primary cell ID code and the temporary cell ID code are identical upon comparison.

4. The method of claim 2, wherein the active cells compare the primary cell ID code with the temporary cell ID code assigned from the RNC; and wherein each active cell identifies itself as a non-primary cell and transmits a Dedicated Physical Control Channel (DPCCH) to the terminal if the primary cell ID code and the temporary cell ID code are not identical upon comparison.

5. The method of claim 2, wherein the primary cell ID code to be transmitted to the cells is segmented into a number of portions and wherein the portions are distributed in the uplink FBI S-field.

6. The method of claim 2, wherein the cell collects the transmitted portions of the primary cell ID code and detects a transmitted cell ID.

7. A communication terminal comprising:
   a transceiver to receive and transmit data; and
   a processor cooperating with the transceiver to perform the steps of,
   receiving a plurality of temporary cell ID codes from a control center;
   measuring a power of a Common Pilot Channel (CPICH) of a cell;
   selecting a temporary cell ID code with a strongest power for the CPICH of the cell;
   if the temporary cell ID code is detected to be 16 bits, puncturing two '0' bits in the selected temporary cell ID code to generate a primary cell ID code having one of the following bit configurations with the punctured bits indicated in parentheses:
   A: (0)000 (0)000
       0 000 0 000
   B: (0)000 (0)000
       1 111 1 111
   C: (0)101 (0)101
       0 101 0 101
   D: (0)101 (0)101
       1 010 1 010
   E: (0)011 (0)011
       0 011 0 011
   F: (0)011 (0)011
       1 100 1 100

G: (0)110 (0)110
0 110 0 110
H: (0)110 (0)110
1 001 1 001; and transmitting the selected 16-bit temporary cell ID code through a 2-bit feedback information (FBI) field of the first 8 slots of one radio frame and transmitting the 14-bit punctured primary cell ID codes through a 2-bit FBI field of the last 7 slots of the radio frame.

8. A method of transmitting a cell ID code in a mobile communication system, in which a primary cell is recognized by receiving a primary cell ID code from a terminal, the method comprising:

receiving a plurality of 16-bit temporary cell ID codes from a control center;

measuring a power of a Common Pilot Channel (CPICH) for active cells that transmit for site selection diversity transmission (SSDT);

selecting a 16-bit temporary cell ID code with a strongest power of the CPICH according to the measuring;

puncturing two '0' bits of the selected 16-bit temporary cell ID code to generate a 14-bit primary cell ID code having one of the following bit configurations with the punctured bits indicated in parentheses:
A: (0)000 0000 (0)000 0000
B: (0)000 1111 (0)000 1111
C: (0)101 0101 (0)101 0101
D: (0)101 1010 (0)101 1010
E: (0)011 0011 (0)011 0011
F: (0)011 1100 (0)011 1100
G: (0)110 0110 (0)110 0110
H: (0)110 1001 (0)110 1001 transmitting the selected 16-bit temporary cell ID code via a 2-bit feedback information (FBI) field of the first 8 slots of one radio frame; and transmitting the generated 14-bit primary cell ID code via a 2-bit FBI field of the last 7 slots of the one radio frame.

9. A method of transmitting a cell ID code in a mobile communication system, in which a primary cell is recognized by receiving a primary cell ID code from a terminal, comprising:

receiving a plurality of temporary cell ID codes from a control center, wherein each temporary cell ID code has a length of 16 bits and one of the following configurations:
A: 0000 0000 0000 0000
B: 0000 1111 0000 1111
C: 0101 0101 0101 0101
D: 0101 1010 0101 1010
E: 0011 0011 0011 0011
F: 0011 1100 0011 1100
G: 0110 0110 0110 0110
H: 0110 1001 0110 1001;

measuring a power of a Common Pilot Channel (CPICH) of a cell;

selecting a temporary cell ID code with a strongest power of the CPICH of the cell;

checking whether the selected temporary cell ID code has a length of 16 bits;

if the selected temporary cell ID code has 16 bits, checking whether a feedback information (FBI) field has a length of 2 bits;

transmitting the selected 16-bit temporary cell ID code via a 2-bit FBI field of the first 8 slots of one radio frame;

puncturing two '0' bits of the selected temporary cell ID code to generate a primary cell ID code having one of the following configurations with the punctured bits indicated in parentheses:
A: (0)000 0000 (0)000 0000
B: (0)000 1111 (0)000 1111
C: (0)101 0101 (0)101 0101
D: (0)101 1010 (0)101 1010
E: (0)011 0011 (0)011 0011
F: (0)011 1100 (0)011 1100
G: (0)110 0110 (0)110 0110
H: (0)110 1001 (0)110 1001 and transmitting the generated primary cell ID code via a 2-bit FBI field of the last 7 slots of the one radio frame.

* * * * *